(12) United States Patent
Dhanoa

(10) Patent No.: US 10,834,009 B2
(45) Date of Patent: Nov. 10, 2020

(54) SYSTEMS AND METHODS FOR PREDICTIVE SCHEDULING AND RATE LIMITING

(71) Applicant: Intel Corporation, Santa Clara, CA (US)

(72) Inventor: Kulwinder Singh Dhanoa, Windsor (GB)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/357,019

(22) Filed: Mar. 18, 2019

(65) Prior Publication Data

US 2019/0215277 A1 Jul. 11, 2019

(51) Int. Cl.
*H04L 12/869* (2013.01)
*H04L 12/873* (2013.01)
*H04L 12/863* (2013.01)
*H04L 12/927* (2013.01)
*H04L 12/805* (2013.01)
*H04L 29/08* (2006.01)
*H04L 12/801* (2013.01)

(52) U.S. Cl.
CPC .............. *H04L 47/58* (2013.01); *H04L 47/52* (2013.01); *H04L 47/528* (2013.01); *H04L 47/623* (2013.01); *H04L 47/628* (2013.01); *H04L 47/805* (2013.01); *H04L 47/36* (2013.01); *H04L 47/39* (2013.01); *H04L 67/322* (2013.01)

(58) Field of Classification Search
CPC ......... H04L 47/00; H04L 47/10; H04L 47/36; H04L 47/365; H04L 47/37; H04L 47/50; H04L 47/52; H04L 47/58; H04L 47/623; H04L 47/628; H04L 47/528; H04L 47/805; H04L 29/08783; H04L 67/322; H04L 25/03019
See application file for complete search history.

(56) References Cited

U.S. PATENT DOCUMENTS

| | | | |
|---|---|---|---|
| 6,608,839 B1 * | 8/2003 | Hammers | H04L 12/5601 370/395.63 |
| 8,116,311 B1 * | 2/2012 | Kunz | H04L 49/90 370/389 |
| 10,216,533 B2 | 2/2019 | Bridgers | |
| 2006/0098681 A1 * | 5/2006 | Cafiero | H04L 61/6022 370/445 |

(Continued)

*Primary Examiner* — Warner Wong
(74) *Attorney, Agent, or Firm* — Fletcher Yoder, P.C.

(57) ABSTRACT

Systems and methods are disclosed for enhancing network performance by using modified traffic control (e.g., rate limiting and/or scheduling) techniques to control a rate of packet (e.g., data packet) traffic to a queue scheduled by a Quality of Service (QoS) engine for reading and transmission. In particular, the QoS engine schedules packets using estimated packet sizes before an actual packet size is known by a direct memory access (DMA) engine coupled to the QoS engine. The QoS engine subsequently compensates for discrepancies between the estimated packet sizes and actual packet sizes (e.g., when the DMA engine has received an actual packet size of the scheduled packet). Using these modified traffic control techniques that leverage estimating packet sizes may reduce and/or eliminate latency introduced due to determining actual packet sizes.

20 Claims, 9 Drawing Sheets

(56) References Cited

U.S. PATENT DOCUMENTS

| | | | |
|---|---|---|---|
| 2007/0189169 A1* | 8/2007 | Wu | H04L 49/254 370/235 |
| 2009/0110061 A1* | 4/2009 | Lee | H04N 19/51 375/240.02 |
| 2009/0168790 A1* | 7/2009 | Lee | H04L 47/527 370/412 |
| 2010/0020686 A1* | 1/2010 | Lee | H04L 41/5003 370/231 |
| 2012/0057601 A1* | 3/2012 | Voruganti | H04L 49/10 370/401 |
| 2012/0327778 A1* | 12/2012 | Stanwood | H04L 47/6275 370/237 |
| 2013/0083654 A1* | 4/2013 | Lee | H04L 43/08 370/230 |
| 2017/0366435 A1* | 12/2017 | Oshiba | H04L 43/0882 |
| 2018/0176144 A1* | 6/2018 | Luo | H04L 47/56 |
| 2018/0191628 A1* | 7/2018 | Francini | H04L 67/322 |
| 2019/0222525 A1* | 7/2019 | Dhanavath | H04L 69/24 |

\* cited by examiner

US 10,834,009 B2

SYSTEMS AND METHODS FOR PREDICTIVE SCHEDULING AND RATE LIMITING

BACKGROUND

The present disclosure relates generally to network interface devices, such as a Quality of Service (QoS) engine, a direct memory access (DMA) engine, and/or a network interface controller (NIC). More particularly, the present disclosure relates to the QoS engine improving traffic control operations between the DMA engine and the NIC.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A Quality of Service (QoS) engine may include a scheduler and/or rate limiters to control rates of packet traffic being sent from host queues to fulfill QoS or Service Level Agreements (SLAs). In particular, a direct memory access (DMA) engine may reference and/or operate in response to the QoS engine to apportion bandwidth, or otherwise regulate transmission of packets from the queues to meet the requirements of SLAs and/or QoS conditions. The scheduler and/or the rate limiters may enable different traffic classes, traffic flows, or the like, to be treated differently such that each traffic class or flow is allocated a particular amount of bandwidth or number of packets for respective transmissions. However, the scheduler and/or the rate limiters may perform these operations based on a known (e.g., actual) packet size, which may lead to delayed and/or inefficient processing of the traffic by the DMA engine (e.g., due to latencies associated with determining the actual packet size).

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
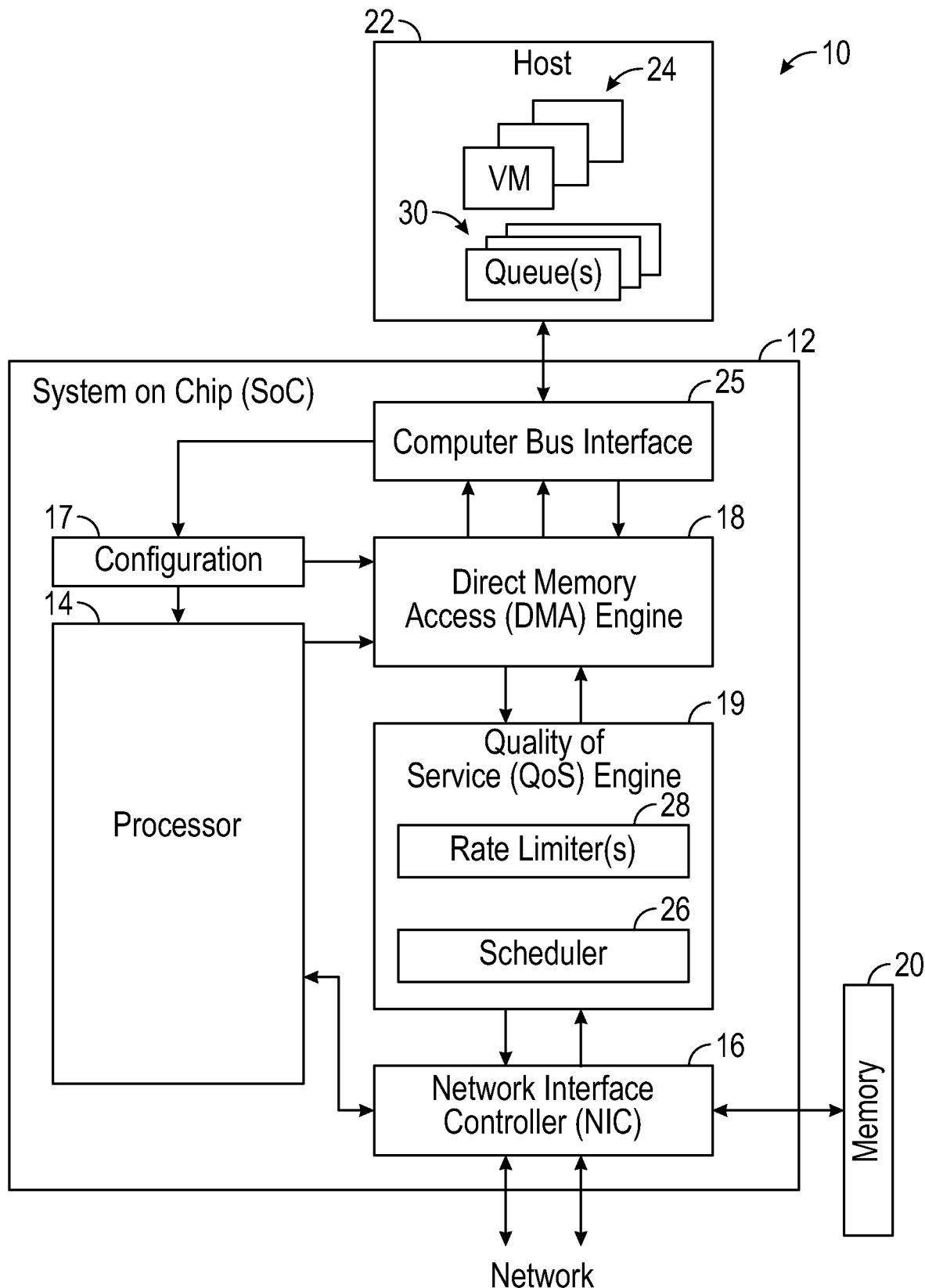
FIG. 1 is a block diagram illustrating a system that includes direct memory access (DMA) engine and a Quality of Service (QoS) engine in accordance with an embodiment of the present disclosure.

One or more specific embodiments are described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Present embodiments relate to systems and methods for enhancing network performance by using modified traffic control (e.g., rate limiting and/or scheduling) techniques to control a rate of packet (e.g., data packet) traffic to a queue scheduled by a Quality of Service (QoS) engine for reading and transmission. In particular, the present embodiments relate to a high-performance network interface device, such as the QoS engine, that controls packet traffic based at least in part on estimated packet size. For example, packets may be scheduled using estimated packet sizes before an actual packet size is known by a direct memory access (DMA) engine and/or the QoS engine. Discrepancies between the estimated packet sizes and actual packet sizes may be compensated for at a later time (e.g., when the QoS engine has received an actual packet size of the scheduled packet). Using these modified traffic control techniques that leverage estimating packet sizes may reduce and/or eliminate latency introduced due to determining actual packet sizes.

In a first embodiment, a method comprises: decreasing a level based at least in part on an estimated packet size in response to scheduling a data packet to be read from a queue, wherein the level tracks bandwidth of data read from host system; receiving an actual packet size of the data packet; determining a correction factor based at least in part on a difference between the actual packet size of the data packet and the estimated packet size; and adjusting the level by applying the correction factor to the level.

In a second embodiment, a device, comprises: a queue configured to queue packets to be read as part of scheduling operations; a rate limiter configured to enforce bandwidth requirements of the device, wherein the rate limiter is associated with a rate limiter level indicative of a current bandwidth allocation to the device; and a quality of service (QoS) engine configured to perform the scheduling operations based at least in part on an estimated packet size and the rate limiter level, wherein the QoS engine is configured to schedule a data packet via the scheduling operations without knowledge of an actual packet size of the data packet.

In a third embodiment, a tangible, non-transitory, machine-readable-medium, comprising machine-readable instructions to cause a processor to: receive a notification that a packet of a queue is to be scheduled; decrease a level based at least in part on an estimated packet size, wherein the level is configured to track an amount of resources allocated for scheduling of the packet; receive an actual packet size of the packet; determine a correction factor based at least in part on a difference between the actual packet size and the estimated packet size; and adjust the level by applying the correction factor.

In some embodiments, the QoS engine may reference credit levels or levels of one or more rate limiters and/or of a scheduler to determine when and in what pattern to schedule packets from one or more queues to be read, while respecting any bandwidth usage constraints (e.g., a constraints established from quality of service (QoS) metrics or serve level agreements (SLAs)). The term "level" or "credit level" used herein refers to a metric that a rate limiter and/or a scheduler may use to determine when to permit scheduling of a packet of data. In particular, each packet may correspond to a queue belonging to a group (e.g., group of one or more queues), and each queue or group may respectively assigned priorities or bandwidth allocations. Each rate limiter may correspond to a certain group, and thus may enforce maximum bandwidth allocation for each queue also corresponding to the certain group. The rate limiter enforcing maximum bandwidth allocations by limiting the bandwidth rate at which the group may send data (e.g., in bits per second (b/s), such as 1 Gigabit per second (Gb/s), packets per second, or any reasonable unit or combination of units). During each scheduling cycle (e.g., periodic duration of time), each rate limiter may increment its corresponding rate limiter level based on the amount of bandwidth allocated to its corresponding group (e.g., 1 Gb). A scheduler may manage respective queue credit levels for multiple queues, and thus may enforce a minimum bandwidth allocation by apportioning bandwidth across the multiple queues. In particular, the scheduler may increment the queue credit level based on the amount of bandwidth allocated by scheduling weight of that queue relative to any additional scheduling weights of other queues. When a packet is scheduled from the queue, the scheduler may decrement the queue credit level corresponding to the queue by the amount of data in the packet (e.g., 100 bytes). The QoS engine instructs the DMA engine to schedule a packet from a queue when the rate limiter level of the queue and the queue credit level of the queue are both above respective threshold values (such as above or a zero value, or not zero or negative) for the separate levels. However, if either of the corresponding rate limiter levels and/or the queue credit level is below or equal to a threshold value (e.g., level equals zero or is negative), the QoS engine does not permit the DMA engine to schedule the packet of the queue.

The credit level and/or levels (e.g., queue credit level and/or rate limiter level) any other suitable format. In some embodiments, a data structure may be used to represent the level, such as in the form of a "credit bucket" or "credit meter." In such a case, a packet may be permitted to be scheduled if the credit bucket of a rate limiter is not devoid of credit or greater than a threshold level, such as when a corresponding level is above zero or is a positive value. Levels may correspond to a granularity of scheduling, such as a group (e.g., a traffic group), traffic class, traffic flow, or the like, and may correspond to one or more customers. If these levels are incremented and/or decremented based on estimated or expected package sizes and/or without having prior knowledge of packet sizes, scheduling operations of the DMA engine and/or the QoS engine may improve and become more efficient. For example, a DMA engine coupled to a QoS engine that uses predictive scheduling (e.g., predictive scheduling operations that may involve a packet size estimate instead of an actual size of the packet at a time of scheduling when the actual size of the packet is otherwise unavailable) may be relatively more efficient and/or experience a reduced amount of latency when compared to a DMA engine coupled to a QoS engine that waits to schedule a packet until an actual size of the packet is available.

With the foregoing in mind, FIG. 1 is a block diagram illustrating a system 10 that includes a system on chip (SoC) 12. It is noted that the system 10 and the SoC 12 are merely one example of a suitable system that uses Quality of Service (QoS) considerations when scheduling packets, and that the QoS considerations may be used in a variety of applications not explicitly discussed herein (such as systems that are not contained on a single integrated circuit or include components that are not disposed on a single integrated circuit). The benefits and improvements gained from application of this current disclosure may be applied in ways not explicitly discussed herein.

The SoC 12 may include any suitable processing circuitry and may be a field programmable gate array (FPGA), a programmable logic device (PLD), or the like, that uses scheduling techniques to manage different QoS considerations. The SoC 12 may include a processor 14 that communicates with a network interface controller (NIC) 16 and/or a direct memory access (DMA) engine 18. The processor 14 and the DMA engine 18 may operate based at least in part on signals and/or configuration data files (e.g., configuration bit streams in some embodiments) received from and/or stored in configuration circuitry 17. The NIC 16 may enable the SoC 12 to transmit data between physical layers and data layers of the system 10, and thus may enable communicate with memory 20 and/or a coupled network. The memory 20 may include a tangible, non-transitory, machine-readable-medium, such as a volatile memory (e.g., a random access memory (RAM)) and/or a nonvolatile memory (e.g., a read-only memory (ROM)). The memory 20 may store a variety of information that may be used for various purposes and, in some embodiments, may include memory used for long term storage and/or short term storage. The DMA engine 18 may be a hardware-based and/or software-based interfacing engine. The NIC 16 may also enable coupling between the system 10 and a network connection (e.g., Ethernet, Wi-Fi) via a suitable wired and/or wireless coupling. A quality of service (QoS) engine 19 may implement the scheduling techniques to manage different QoS considerations, such as scheduling of packets generated by a host device and/or host logic from one or more queues of the host device and/or the host logic.

For example, the system 10 may also include a host device or logic (which may include circuitry, software, or both) (e.g., host 22) and one or more virtual machines 24 (VM). The virtual machines 24 may emulate computer machines and/or run computer applications (e.g., software). The host 22 may manage the emulations of the virtual machines 24, such as by managing requests for information accessible via the network connection provided by the NIC 16 or in memory 20. As such, the host 22 may manage multiple users using multiple virtual machines 24. The NIC 16 and/or other circuitry of the SoC 12 may be accessible by and/or may communicate with the host 22 via a computer bus interface 25 (e.g., a personal computer (PC) bus). The computer bus interface 25, for example, may be a peripheral component interconnect express (PCIe) interface or other suitable interfacing circuitry to communicatively couple the SoC 12 to external circuitry. The virtual machines 24 may be supported by vendor-agnostic interfaces to enable software running on the virtual machines 24 to access devices such as the NIC 16, memory 20, or other components within the SoC 12 or the system 10.

The host 22 may include memory allocated to a transmit ring and/or a receive ring. The transmit ring and/or receive rings may be used by the NIC 16 to process packets (e.g., data packets). Software and/or hardware may generate transaction requests on behalf of the SoC 12 or other processing circuitry. The transmit ring and/or receive rings may be a data structure that uses a single, fixed-size buffer as if it were connected end-to-end, such as a circular ring. The DMA engine 18, a QoS engine 19, and/or the NIC 16 may schedule and/or handle packets of the host 22 based at least in part on information relevant to the packet (e.g., length, end of packet indicator, or the like) stored within the transmit ring and/or receive ring, such as within a descriptor.

Sometimes during operation of the system 10, such as during an emulation on one or more of the virtual machines 24, operation of the SoC 12, communication between the system 10 and the network via the NIC 16, or the like, a packet may be generated by a portion of the host 22 and thus is to be scheduled for transmission to the network and/or the memory 20. The QoS engine 19 may instruct the DMA engine 18 on how to schedule (e.g., an order) packets of the host 22. For example, the QoS engine 19 may include a scheduler 26 and one or more rate limiters 28 that manage levels used when scheduling the packets from one or more queue(s) 30 of the host 22. It is noted that, in some embodiments, the DMA engine 18 may include a part or all of the QoS engine 19, despite being depicted herein as separate components.

It is noted that although the present disclosure is described as related to the QoS engine 19 instructing the DMA engine 18 on when and in what order to schedule packets from the host 22, the techniques described herein may be applied to other systems, such as other DMA engines implemented in hardware to read and/or write packets to and/or from host processor systems (e.g., server, computing system, electronic workstation). For example, a computing system that offloads a host interface into hardware may use techniques described herein to improve communications (e.g., by reducing latencies associated with determining actual packet sizes) between guest virtual machines and other devices, such as network card and/or storage media (e.g., a virtio system that provides a vendor agnostic interface for software running on guest virtual machines to enable access to other the devices).

During operation of the system 10, the QoS engine 19 (via instruction to the DMA engine 18) may schedule a packet based on an actual size the packet. Scheduling based on the actual size of the packet may be suitable for systems that use a suitable communication protocol between the host 22 and SoC 12 that advertises the packet size early on in the process. However, scheduling based on the actual size of the packet may add unwanted latency and may not scale in a suitable manner for other communication protocols, such as virtio. In particular, the QoS engine 19 may determine the packet size of each packet at the time of scheduling, but only by reading descriptors storing the packet size, which may take an excessive amount of time if another processing step is required before the descriptors can be read (e.g. reading the index of the descriptors to go and fetch). That is, the QoS engine 19 may read descriptors on the system 10 holding information about where packets are stored and/or a size of the packets. These descriptors may be stored in tables, rings, or the like. Typically, the system 10 may include many different descriptor tables. For example, the system 10 may include a variety of the virtual machines 24, containers, different applications, or the like, that may share access to common resources, such as the memory 20 and/or the network coupled through the NIC 16. Each of these sources (e.g., virtual machines 24, containers, applications, or the like) may be serviced by a separate table, circular ring, or other suitable data store. The QoS engine 19 may not know the packet size of a packet until reading the descriptor stored in a suitable data store. In some embodiments, the DMA engine 18, other circuitry of the SoC 12, and/or a combination of the QoS engine 19, the DMA engine 18, and the other circuitry of the SoC 12 determine the packet size of the packet. However for ease of description, the QoS engine 19 is described herein as determining the packet size of the packet.

To reduce these latency and scalability problems, traffic controlling operations (e.g., scheduling operations) may be improved by the QoS engine 19 scheduling packets before reading descriptors, and hence without prior knowledge of packet sizes. When the QoS engine 19 schedules a packet of a queue 30 to be sent without knowledge of the actual packet size, the QoS engine 19 may reduce a queue credit level of the queue 30 and/or a rate limiter level of a group (or groups) that the queue 30 belongs to (e.g., a group of queues 30 including the queue 30) based on an estimated packet size. The QoS engine 19 may subsequently adjust the queue credit level based on a correction factor indicative of a difference (e.g., discrepancy) between the actual packet size and the estimated packet size to compensate for the actual bandwidth amount used to transmit the actual packet. The QoS engine 19 may determine the actual packet size after scheduling or during scheduling of the packet by referencing the descriptors, however the QoS engine 19 is now free to perform the referencing while scheduling operations of the QoS engine 19 and/or the DMA engine 18 are ongoing, therefore reducing additional latency. In this way, any suitable processing circuitry of the system 10 may determine the actual packet size of the data packet scheduled from the queue 30 and may use the actual packet size to determine the correction factor to be transmitted to the QoS engine 19 for application to the queue credit level and/or the rate limiter level. Although described herein as the QoS engine adjusting the queue credit levels and/or the rate limiter levels, it should be understood that in some embodiments the DMA engine 18, or any suitable processing circuitry, may directly adjust the queue credit levels and/or the rate limiter levels.

In a similar manner, queue credit level when a packet from a queue 30 is scheduled, the QoS engine 19 may reduce a rate limiter level of a group (e.g., a queue 30 group, a group of queues 30 that share a rate limiter and have packets scheduled based at least in part on a shared rate limiter level) based on an estimated packet size. The QoS engine 19 may subsequently adjust the rate limiter level based on the correction factor indicative of the difference (e.g., discrepancy) between the actual packet size and the estimated packet size to compensate for the actual bandwidth amount used to transmit the actual packet.

Figure 2:
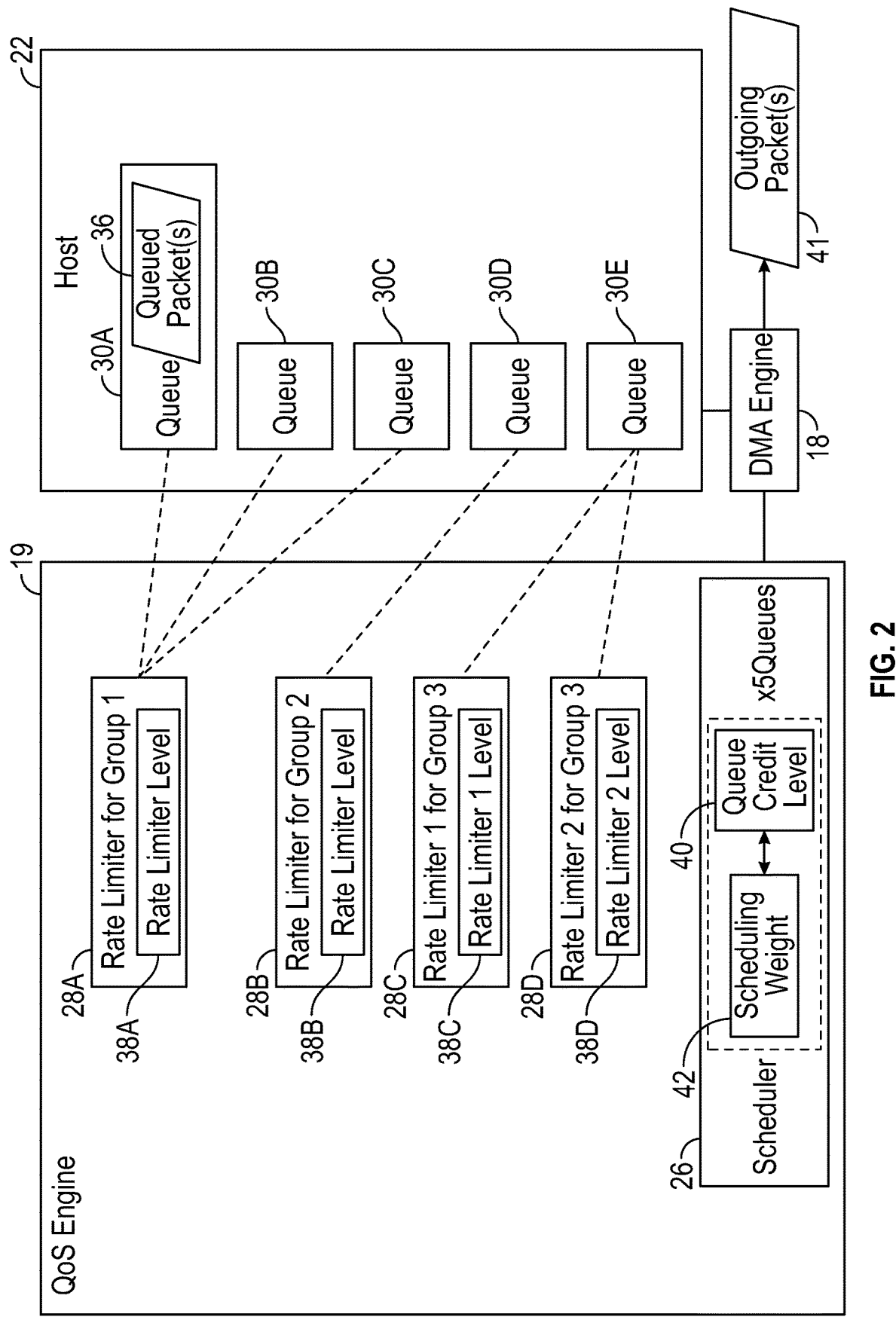
FIG. 2 is a block diagram of the QoS engine of FIG. 1 including rate limiters and a scheduler in accordance with an embodiment of the present disclosure.

To help elaborate, FIG. 2 is a block diagram of an example arrangement of the scheduler 26 and/or the rate limiters 28 associated with the QoS engine 19. Each respective queue 30 may include queued packets 36 to be sent to the SoC 12 by the host 22. Each queue 30 may correspond to one or more rate limiters 28, and the scheduler 26 may schedule packets to be sent from the queues 30. The host 22 may include any suitable number of queues 30. The rate limiters 28 may facilitate the scheduling of packets to be sent from (e.g., read from) its corresponding queue 30 in such a way as to not exceed a prescribed bandwidth for the queue 30 (e.g., enforce a maximum bandwidth allocation). The scheduler 26 may manage allocation of the bandwidth (e.g., manage a proportion of total bandwidth) across the different queues 30 (e.g., enforce a minimum bandwidth allocation).

In the depicted example, the QoS engine 19 includes various combinations of queues 30 and rate limiters 28. It should be understood that any reasonable combination of queues 30 and rate limiters 28 may be used. In some embodiments, one rate limiter (e.g., 28B) corresponds to one queue 30 (e.g., 30D). In additional or alternative embodiments, multiple rate limiters (e.g., 28C, 28D) correspond to one queue 30 (e.g., 30E) to enforce multiple conditions corresponding to the queue. For example, a first rate limiter 28C may enforce a bandwidth allocation of the queue 30E, while a second rate limiter 28D may enforce a packet allocation of the queue 30E. However, it may also be suitable in some embodiments to have one rate limiter (e.g., 28A) correspond to multiple queues 30 (e.g., 30A, 30B, 30C), such as when the multiple queues 30 correspond to multiple users. In these embodiments, the one rate limiter may define a shared metric by which to control scheduling of packets from the multiples queues 30 (e.g., as may be the case if the multiple users have each agreed to a same bandwidth allocation, a same packet allocation, a same QoS metric, a same SLA, or the like, and thus may be managed via a shared rate limiter 28D). In each of these depicted examples, the queues 30 share the scheduler 26 (which defines the proportion of a total bandwidth allocated to each of the queues 30). The scheduler 26 tracks the respective bandwidth allocated to each of the queues 30 through changing respectively assigned queue credit levels for the queues 30.

To elaborate, the QoS engine 19 may track bandwidth allocations via rate limiter levels 38 (e.g., 38A, 38B, 38C, 38D) and queue credit levels 40. Each of the levels 38, 40 may be implemented in the system 10 as a numerical value or counter stored in memory 20 and/or locally within the QoS engine 19, or any other suitable indicator to respectively track levels associated with the scheduler 26 and/or the rate limiters 28. Each queue 30 of the host 22 may be used to queue outgoing packets 41 to read by the DMA engine 18. The QoS engine 19 via the rate limiters 28 may determine when packets of corresponding groups may be read from queue 30 (e.g., when bandwidth is available for a particular group), while the QoS engine 19 via the scheduler 26 may determine which of the groups are permitted to be read from by the DMA engine 18 (e.g., based on respectively defined scheduling weights of the particular queue 30).

The QoS engine 19 via the rate limiter 28 may adjust the rate limiter levels 38 assigned to each group based on a bandwidth configuration of the corresponding group. In particular, the rate limiter 28 may increase the rate limiter levels 38 assigned to each group by a predetermined bandwidth amount. The predetermined bandwidth amounts may be based on a maximum bandwidth to be allocated to that group for a duration of time. For example, the group assigned to the rate limiter 28A may be assigned a predetermined bandwidth amount equaling 10 bytes per second and the group assigned to the rate limiter 28B may be assigned 100 bytes per second. In this example, the rate limiter 28 thus adds 10 bytes to the rate limiter level 38A each second and 100 bytes to the rate limiter level 38B each second. Thus, the rate limiter levels 38 may be incremented independent of scheduling of packets by the DMA engine 18 and/or the QoS engine 19 and may instead correspond to a system clock, or other suitable defined time period.

The QoS engine 19 may permit the DMA engine 18 to schedule packets of a queue 30. For purposes of this disclosure, a level (e.g., a rate limiter levels 38, queue credit levels 40) may be sufficient to schedule a packet is at least sufficient to schedule an estimated packet size of the packet, and thus is greater than a threshold amount (e.g., zero, a positive amount).

Furthermore, the QoS engine 19 may permit the DMA engine 18 to schedule packets based at least in part on scheduling weights 42 (e.g., a weight parameter, a scheduling weight parameter). Scheduling weights 42 may be defined for each queue 30 and may define permitted bandwidth allocations relatively between the queues 30 of a same group. The QoS engine 19 via the scheduler 26 may manage this in a variety of ways, including through the allocation of credit to the queue credit levels 40 (e.g., to maintain the desired ratio of scheduling), through scheduling of the packets from the respective queues 30 (e.g., permitting a particular ratio of packets to be schedule relatively between the queues 30), or the like. In this way, the scheduler 26 may allocate bandwidth for a queue 30 (e.g., 30A, having a scheduling weight of 1) and to a second queue (e.g., 30B, having a scheduling weight of 10) such that, after the scheduling operation occurs for the queue 30, one packet of the queue 30 is scheduled while ten packets of the queue 30 are scheduled. Furthermore, in some embodiments, the scheduler 26 may allocate bandwidth for a queue 30 based on its scheduling weight and a total bandwidth available. For example, the scheduler 26 may have a first queue 30 (e.g., 30A) with a scheduling weight of 2 and a second queue 30 (e.g., 30B) with a scheduling weight of 1, such that the total is 3, and thus the first queue 30 is allocated ⅔ (e.g., 66.7%) of a total available bandwidth for the first queue 30 while the second queue 30 is allocated ⅓ (e.g., 33.3%).

In some embodiments, the queues 30 or the groups of queues 30 may be assigned weights based on Service Level Agreements (SLA) and/or QoS commitments. In this way, a first customer or user corresponding to a first queue 30 (e.g., of a first group) may have paid for, and thus is to be provided, a first QoS metric, while a second customer or user, corresponding to a second queue 30 (e.g., of a second group), is to be provided a second QoS metric. Thus, the QoS engine 19 may operate using the rate limiters 28 to fulfil SLAs to provide QoS metrics specific to customers. The QoS engine 19 may use groups of queues 30 (e.g., defined on a per-customer basis) to manage different QoS levels for each customer. It is noted that multiple customers may share a rate limiter 28 if the customers have each respectively committed to share the same QoS. In the event that two customers have each respectively committed to a different QoS, the customers may be assigned to respective groups, each group having at least one respective rate limiter 28. For example, if a first customer agreed to a bandwidth of 10 bytes/second and a second customer agreed to a bandwidth of 100 bytes/second, a queue 30A of the first customer may be assigned to a rate limiter 28A of a first group (that is shared between other customer queues 30B, 30C) while the second customer may be assigned to a rate limiter 28B of a second group (that may or may not be shared between other customer queues 30).

Rate limiter levels 38 may be adjusted at each scheduling cycle, where a scheduling cycle may correspond to a period of time of the system 10 that a total bandwidth used by the queue 30 is considered over. Thus, during completion of and/or at the completion of a scheduling cycle, the rate limiter levels 38 may be adjusted to enable additional packets to be scheduled by the DMA engine 18. The rate limiter levels 38 and/or the queue credit levels 40 may be adjusted based on a variety of factors including a total determined bandwidth at the time of adjustment, a predetermined adjustment value, or the like, as will be appreciated herein.

The QoS engine 19 via the scheduler 26 and/or the rate limiters 28 may deduct credit from the respective rate limiter levels 38 and/or the queue credit levels 40 based at least in part on an estimated packet size of a scheduled packet. At a later time (e.g., after the scheduling of the packet), the QoS engine 19 may determine that there is a discrepancy between an actual size of the packet and the estimated packet size used in the packet scheduling to adjust levels in the rate limiter levels 38 and/or the queue credit levels 40. In response to the determination of the discrepancy, the QoS engine 19 may determine a correction factor to adjust the rate limiter levels 38 and/or the queue credit levels 40 by to compensate for the discrepancy between the packet sizes.

Figure 3:
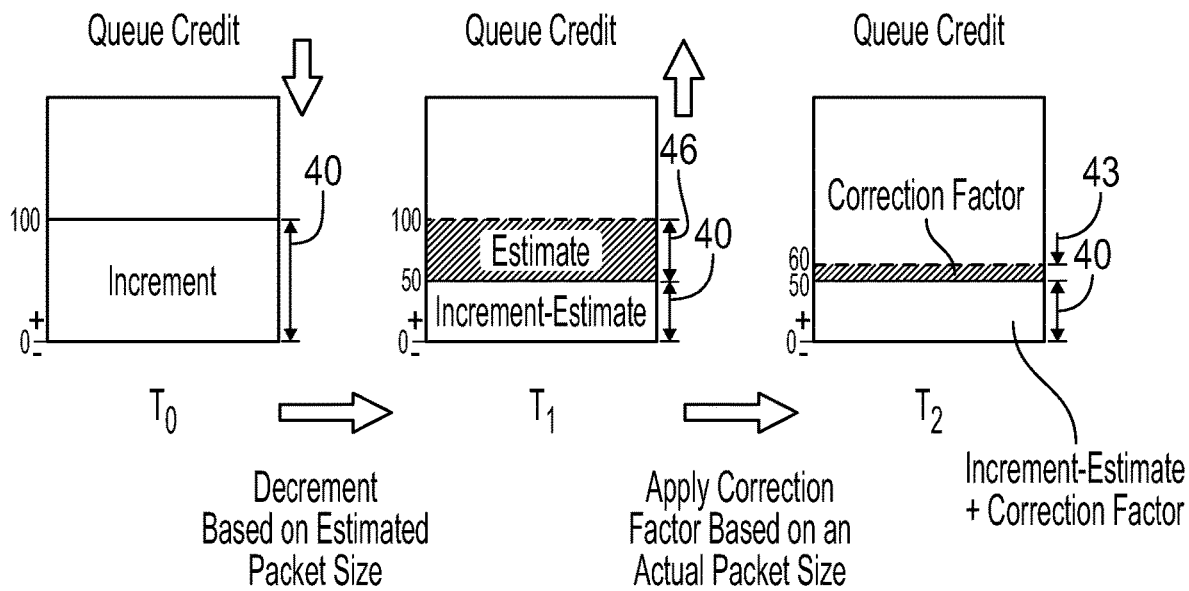
FIG. 3 is a diagram illustrating applying a positive correction factor to a level of the scheduler of FIG. 2 in accordance with an embodiment of the present disclosure.

With the foregoing in mind, FIG. 3 is a diagram illustrating applying a positive correction factor to a queue credit level 40, according to embodiments of the present disclosure. The QoS engine 19 may determine the actual packet size after scheduling or during scheduling of the packet by referencing the descriptors, as described above. The QoS engine 19 may subsequently adjust the queue credit level 40 based on the correction factor 43 to compensate for a difference between the actual packet size and the estimated packet size.

As illustrated in FIG. 3, at a first time (e.g., to), the queue credit level 40 for a certain queue 30 may have previously had 100 bytes of credit added by the scheduler 26. Thus, at the first time, the queue credit level 40 may equal 100 bytes of total credit.

Scheduling packets of the group may cause deductions from the queue credit level 40 for that group. As illustrated, at a second time (e.g., $t_1$), the QoS engine 19 may schedule a packet to be read from the queue 30. However, the QoS engine 19 (e.g., and thus the scheduler 26) may not know the size of the packet to be scheduled. Thus, the scheduler 26 may deduct credit from the queue credit level 40 based on a packet estimate size. In this example, the packet estimate size equals 50 bytes, however, it should be understood that any suitable packet estimate size may be used based on the system 10 (such as 1 bit-1000 kilobytes (kBs), 1 byte-100 kilobytes, 10 bytes-64 kilobytes, and so on). The deduction of credit equal to the packet estimate size is represented by credit deduction 46. Furthermore, in some embodiments, the packet estimate size may change during operation of the system 10 based on operations, average correction factors applied to the queue credit level 40 over time, bandwidth allocations, standard deviations between correction factors applied over time, or the like. It is noted that the dashed line represents the original queue credit level 40 of 100 bytes and the solid line represents the subsequent queue credit level 40 of 50 bytes.

At a third time (e.g., $t_2$), the packet may be scheduled and/or read (e.g., an outgoing packet 41). Moreover, at this time, the QoS engine 19 may know the actual size of the packet and thus may apply a correction factor 43 to the queue credit level 40 to adjust for any discrepancy between the packet estimate size and the actual packet size. In this example, the QoS engine 19 applies a correction factor 43 equal to 10 bytes to the queue credit level 40. That is, the QoS engine 19 determined that the actual packet size of this example was 40 bytes (e.g., by reading descriptors storing the actual packet size after sending the packet), and compensates for this discrepancy between the packet estimate size and the actual packet size by adding 10 bytes to the queue credit level 40 (e.g., 50 bytes of the estimated packet size minus 10 bytes of the correction factor 43 equals 40 bytes of the actual packet size). This is an example of a positive correction factor 43 since the value of the correction factor 43 is greater than a zero value. It is noted that the dashed line represents the original level of 50 bytes and the solid line represents the final level of 60 bytes. This example is an example of a positive correction factor 43 because the QoS engine 19 adds credit to the queue credit level 40 to adjust for the difference between the packet estimate size and the actual packet size.

Figure 4:
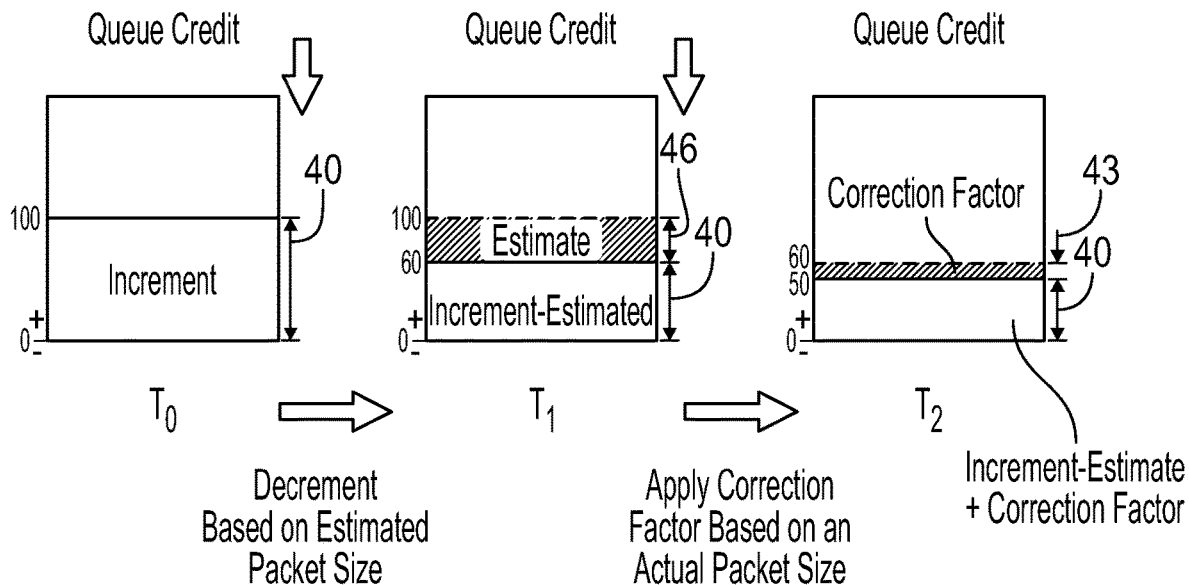
FIG. 4 is a diagram illustrating applying a negative correction factor to a level of the scheduler of FIG. 2 in accordance with an embodiment of the present disclosure.

FIG. 4 is a diagram illustrating applying a negative correction factor 43 to the queue credit level 40. Similar to FIG. 3, the queue credit level 40 for a certain group may have previously had 100 bytes of credit added by the scheduler 26 (e.g., at to). In this example, the packet estimate size equals 40 bytes. The deduction of credit equal to the packet estimate size is represented by the credit deduction 46. Thus, also similar to FIG. 3, the scheduler 26 may deduct credit from queue credit level 40 based on the packet estimate size in response to a packet being scheduled at a second time (e.g., $t_1$). It is noted that the dashed line represents the original level of 100 bytes and the solid line represents the subsequent level of 60 bytes.

At a third time (e.g., $t_2$), the packet may be outgoing and/or have been sent. At this time, the QoS engine 19 may know the actual size of the packet (e.g., by reading descriptors storing the actual packet size after sending the packet) and thus may apply a correction factor 43 to the queue credit level 40. In this example, the QoS engine 19 applies a correction factor 43 equal to −10 bytes. That is, the QoS engine 19 determines that the actual packet size of this example was 50 bytes, and the QoS engine 19 compensates for this discrepancy between the packet estimate size and the actual packet size by deducting 10 bytes from the queue credit level 40 (e.g., 40 bytes of the packet estimate size minus −10 bytes equals 50 bytes of the actual packet size). This is an example of a negative correction factor 43 since the value of the correction factor 43 is less than a zero value. It is noted that the dashed line represents the original level of 60 bytes and the solid line represents the final level of 50 bytes. This is an example of a negative correction factor 43 because the QoS engine 19 removed credit from the queue credit level 40 to adjust for the difference between the packet estimate size and the actual packet size.

Figure 5:
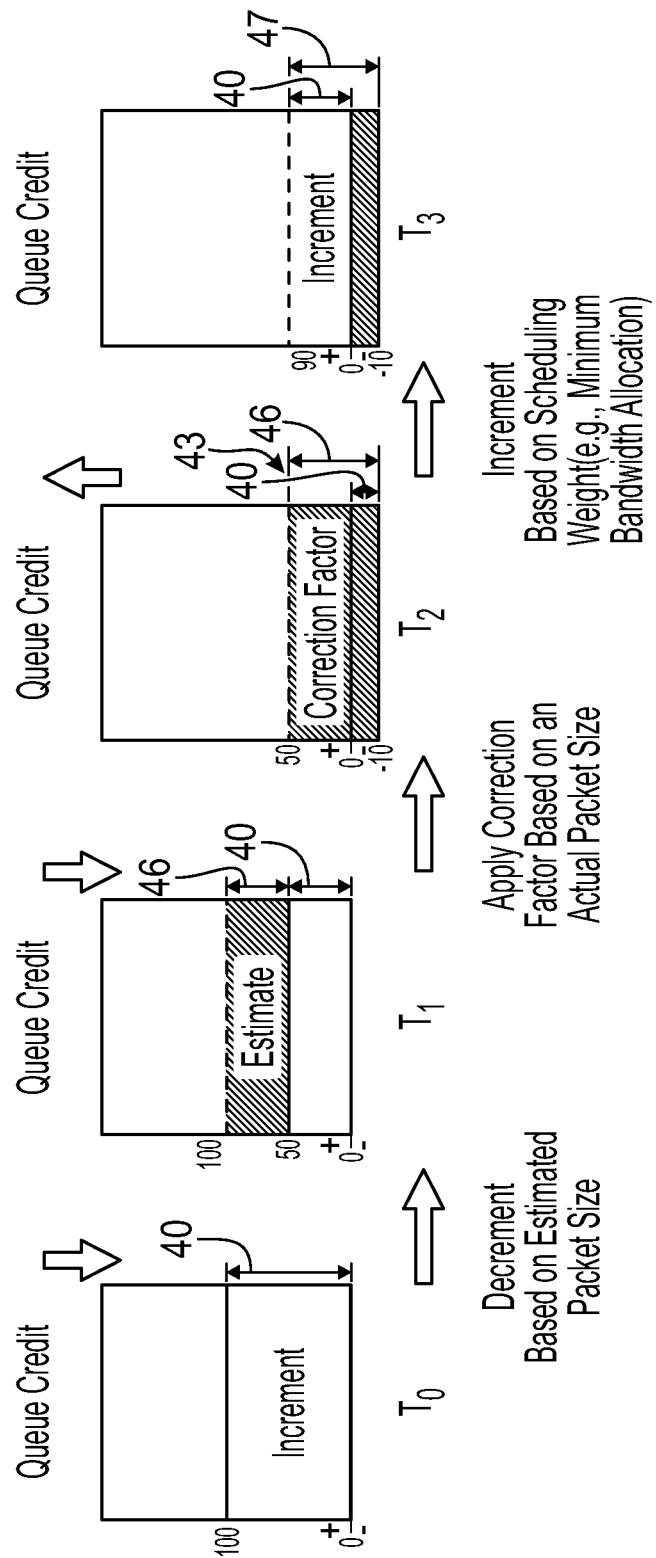
FIG. 5 is a diagram illustrating a negative level of the scheduler of FIG. 2 due to applying a negative correction factor in accordance with an embodiment of the present disclosure.

FIG. 5 is a diagram illustrating a negative queue credit level 40 due to applying a negative correction factor. Similar to the negative correction factor 43 applied in FIG. 4, a correction factor 43 applied at a third time (e.g., $t_2$) in this example adjusts for a difference between the packet estimate size and the actual packet size. However, unlike the first negative correction factor 43 example, the correction factor 43 used in this example is a large enough negative number to cause the level of the queue credit level 40 to be adjusted to a negative value (e.g., level=−10 bytes). That is, in this example, the QoS engine 19 determined that the actual packet size was 100 bytes, and the QoS engine 19 compensated for this discrepancy between the packet estimate size (e.g., 50 bytes) and the actual packet size (e.g., 110 bytes) by deducting 60 bytes from the queue credit level 40 (e.g., the packet estimate size equaled 50 bytes minus −60 bytes of the correction factor equals 110 bytes of the actual packet size).

When the queue credit level 40 is negative or zero, the QoS engine 19 may not instruct DMA engine 18 to schedule any packets for the queue corresponding to that queue credit level 40. Over time, credit may be added back to the queue credit level 40 and the queue credit level 40 may increase over time to become positive once again. When the credit of the queue credit level 40 is positive and/or is sufficiently large to enable scheduling of a packet (e.g., has a credit amount at least as large as the packet estimate size and/or greater than a threshold amount), the QoS engine 19 may permit scheduling of packets corresponding to the queue of the queue credit level 40. Thus, the ability of the queue credit level 40 to have negative values enables negative correction factors 43 to be applied to compensate for discrepancies between packet estimate sizes and actual packet sizes, where the actual packet sizes are greater than the packet estimate sizes, and the negative correction factors 43 are greater in magnitude to the queue credit level 40 (e.g., causing the queue credit level 40 to become negative when applied). Without this ability, the QoS engine 19 may not be able to compensate for such discrepancies.

As illustrated in FIG. 5, the queue credit level 40 at the third time (e.g., $t_2$) equals a negative level. During the time between the third time (e.g., $t_2$) and a fourth time (e.g., $t_3$), the scheduler 26 may add a programmed amount of credit (in this case, 100 bytes represented by credit 47) to the queue credit level 40. This manifests as a credit change from −10 bytes to a positive 90 bytes. The level may now be greater than a threshold value (e.g., greater than zero, greater than or equal to the packet estimate size), and a packet may be scheduled according to the queue credit level 40 in response to the level being greater than the threshold value. However, if no packet is to be scheduled, the queue credit level 40 may continue to be increased by the scheduler 26 (e.g., such as, until reaching a maximum value and/or until a packet is to be scheduled for the corresponding queue 30).

Figure 6:
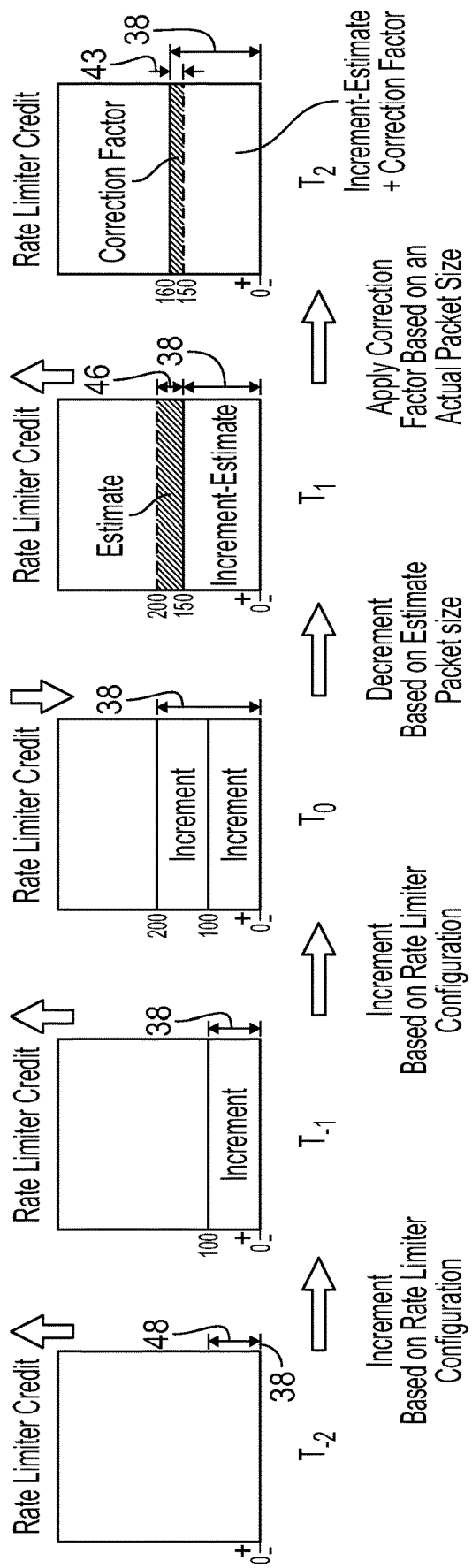
FIG. 6 is a diagram illustrating applying a positive correction factor to a level of the rate limiter of FIG. 2 in accordance with an embodiment of the present disclosure.
Figure 7:
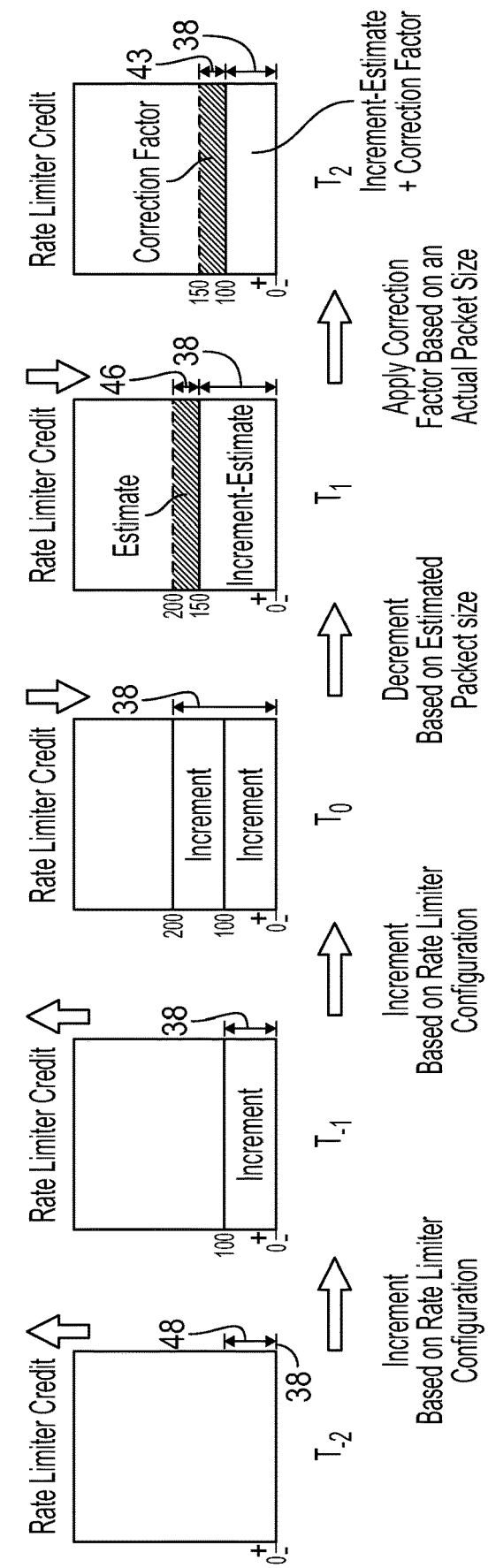
FIG. 7 is a diagram illustrating applying a negative correction factor to a level of the rate limiter of FIG. 2 in accordance with an embodiment of the present disclosure.
Figure 8:
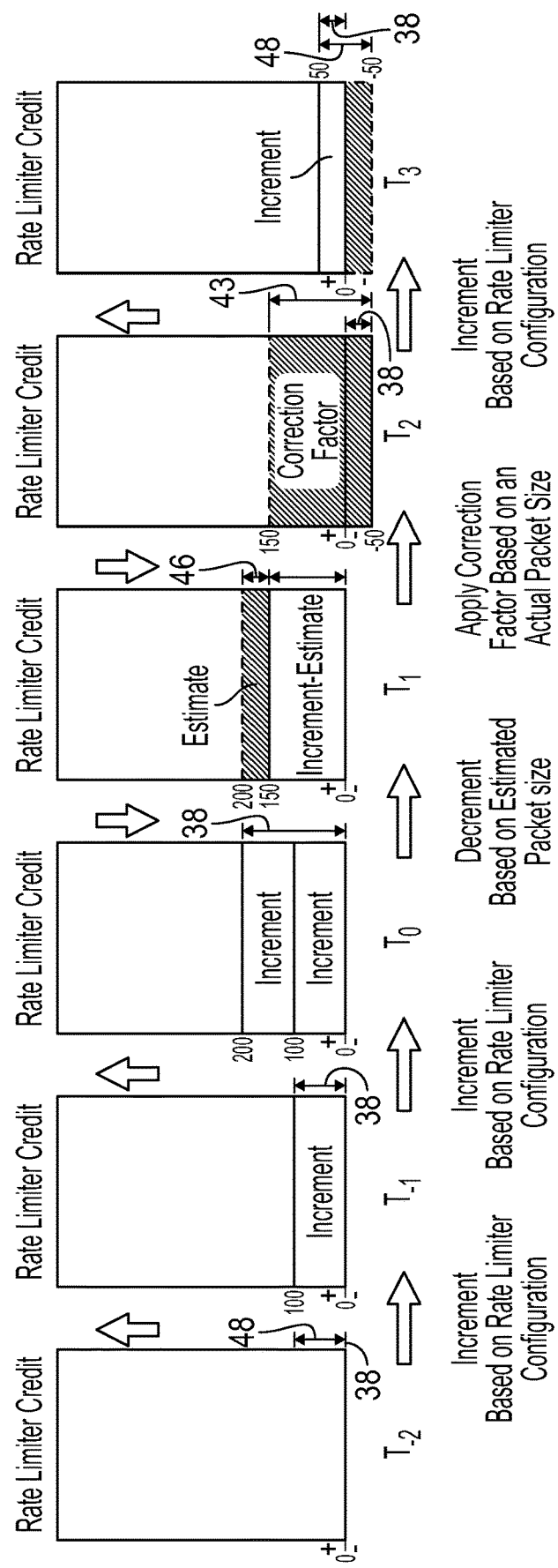
FIG. 8 is a diagram illustrating a negative level of the rate limiter of FIG. 2 due to applying a negative correction factor in accordance with an embodiment of the present disclosure.

FIGS. 6-8 discuss scheduling operations with regard to the rate limiters 28. FIG. 6 is a diagram illustrating an example of applying a positive correction factor 43 to a rate limiter level 38, according to embodiments of the present disclosure. The rate limiter level 38, similar to the queue credit level 40, may be adjusted after a time of packet scheduling to compensate for any discrepancies between an estimated packet size and an actual packet size.

Before the first time described above (e.g., to), the QoS engine 19 via the rate limiter 28 incremented the rate limiter level 38 twice according to a configuration of the rate limiter 28. For example, between $t_{-2}$ and $t_{-1}$, the rate limiter level 38 is increased by an amount 48. The amount 48 may be based at least in part on a bandwidth allocation for the corresponding group of the rate limiter 28. In this way, the rate limiter 28 adjusts the rate limiter level 38 by a same amount at the beginning of each scheduling cycle, where a scheduling cycle may correspond to a period of time that a total bandwidth used by a group of queues 30 is considered over. For example, and as depicted, the rate limiter 28 may add 100 bytes of credit to the rate limiter level 38 each second (e.g., each scheduling cycle) based on a bandwidth allocation equaling 100 bytes-per-second assigned to the group corresponding to the rate limiter 28.

The rate limiter 28 may continue to add credit to the rate limiter level 38 while the DMA engine 18 and/or the QoS engine 19 schedules one or more packets from the queue 30. Between the first time and a second time (e.g., $t_1$), the DMA engine 18 schedules a packet from the queue 30 corresponding to the rate limiter 28. Thus, at the second time, the rate limiter 28 decreases the rate limiter level 38 in response to the scheduling of the packet from its queue 30. The rate limiter 28 may decrease the rate limiter level 38 by an amount equal to the packet estimate size (e.g., 50 bytes).

At a third time (e.g., $t_2$), the packet may be outgoing and/or have been scheduled. Moreover, between the second time and the third time, the DMA engine 18 and/or the QoS engine 19 may know the actual size of the packet, and thus the QoS engine 19 may apply a correction factor 43 to the rate limiter level 38 to adjust for any discrepancy between the packet estimate size and the actual packet size. In this example, the QoS engine 19 applies a correction factor 43 equal to 10 bytes to the rate limiter level 38. That is, the QoS engine 19 determines that the actual packet size of this example was 40 bytes, and the QoS engine 19 compensates for this discrepancy between the packet estimate size and the actual packet size by adding 10 bytes (e.g., 50 bytes of the estimated packet size minus 10 bytes of the correction factor 43 equals 40 bytes of the actual packet size).

FIG. 7 is a diagram illustrating an example of applying a negative correction factor 43 to a rate limiter level 38, according to embodiments of the present disclosure. Similar to FIG. 5, the rate limiter level 38 may have previously had a particular amount of credit added based on bandwidth allocations for its corresponding group. Thus, at the first time (e.g., $t_0$), the rate limiter level 38 may equal 200 bytes, which may correspond to a particular amount of scheduling cycles (e.g., 2, or any suitable number as defined by the respective bandwidth allocation).

In this example, the packet estimate size equals 50 bytes. The deduction of credit equal to the packet estimate size is represented by the credit deduction 46. Thus, also similar to FIG. 3, QoS engine 19 via the rate limiter 28 may deduct credit from rate limiter level 38 based on the packet estimate size at a second time (e.g., $t_1$). It is noted that the dashed line represents the original level of 200 bytes and the solid line represents the subsequent level of 150 bytes.

At a third time (e.g., $t_2$), the packet may be outgoing and/or have been sent. Between the second time and the third time, the QoS engine 19 may determine the actual size of the packet and thus the QoS engine 19 may apply a correction factor 43 to the rate limiter level 38. In this example, the QoS engine 19 applies a correction factor 43 equal to −50 bytes. That is, the QoS engine 19 determines that the actual packet size of this example was 100 bytes, and the QoS engine 19 compensates for this discrepancy between the packet estimate size and the actual packet size by deducting 50 bytes (e.g., 50 bytes of the packet estimate size minus −50 bytes equals 100 bytes of the actual packet size). It is noted that the dashed line represents the original level of 150 bytes and the solid line represents the final level of 100 bytes. This is an example of a negative correction factor 43 because the QoS engine 19 removed credit from the rate limiter level 38 to adjust for the difference between the packet estimate size and the actual packet size.

FIG. 8 is a diagram illustrating a negative rate limiter level 38 due to an applying a negative correction factor, according to embodiments of the present disclosure. Similar to the negative correction factor 43 applied in FIG. 7, a correction factor 43 applied at or before a third time (e.g., $t_2$) in this example adjusts for a difference between the packet estimate size and the actual packet size. The correction factor 43 used in this example is negative enough to cause the level of the rate limiter level 38 to be adjusted to a negative value (e.g., level=−50 bytes). In this example, the QoS engine 19 determined that the actual packet size was 250 bytes and compensated for this discrepancy between the packet estimate size and the actual packet size by deducting 200 bytes from the rate limiter level 38 (e.g., the packet estimate size equaled 50 bytes minus −200 bytes of the correction factor equals 250 bytes of the actual packet size).

When the rate limiter level 38 is negative or zero, the rate limiter 28 may continue to add credit to the rate limiter level 38 according to its configurations. However, the rate limiter level 38 may take longer to reach a threshold value when starting at a negative value than when starting at a value less than the threshold but greater than the negative value. In this way, the rate limiter 28 is able to compensate for any potential over-scheduling of its queue 30 by delaying further scheduling until credit is provided back to the rate limiter level 38. In this way, over time, the rate limiter 28 may add credit back to the rate limiter level 38 based on the bandwidth allocations and the scheduling cycle, and thus the rate limiter level 38 may increase over time to become positive. When the level of the rate limiter level 38 is positive and/or is sufficiently large to permit scheduling of a packet (e.g., has a credit amount at least as large as a threshold value), the QoS engine 19 may instruct the DMA engine 18 to resume scheduling operations corresponding to the rate limiter level 38.

As illustrated in FIG. 8, the rate limiter level 38 at the third time (e.g., $t_2$) equals a negative level. Similar to the queue credit level 40, the ability of the rate limiter level 38 to have negative values enables negative correction factors 43 to be applied to compensate for discrepancies between packet estimate sizes and actual packet sizes, where the actual packet sizes are greater than the packet estimate sizes, and the negative correction factors 43 are greater in magnitude to the rate limiter level 38 (e.g., causing the rate limiter level 38 to become negative when applied). Without this ability, the rate limiter 28 may not be able to compensate for such discrepancies. During the time between the third time (e.g., $t_2$) and a fourth time (e.g., $t_3$), the rate limiter 28 may add the programmed amount of credit (in this case, 100 bytes corresponding to the amount 48) based at least in part on the bandwidth allocation for the corresponding group. This manifests as a credit change from −50 bytes to a positive 50 bytes. Since the level is now sufficiently positive (e.g., greater than or equal to the packet estimate size), the rate limiter 28 may proceed to deduct credit from the rate limiter level 38 and schedule a packet from the corresponding queue 30.

FIGS. 3-8 are discussed herein in terms of a programmed amount of credit being added to the queue credit level 40 and/or the rate limiter level 38 for each respective component. The scheduler 26 may add credit to the queue credit level 40 and/or the rate limiter 28 may add credit to the rate limiter level 38 according to programmed amounts and/or programmed patterns. However, the scheduler 26 may add credit to the queue credit level 40 and/or the rate limiter 28 may add credit to the rate limiter level 38 following different patterns based on the embodiment, such as in a middle and/or end of a scheduling cycle. Furthermore, in some embodiments, the scheduler 26 may add credit to the queue credit level 40 and/or the rate limiter 28 may add credit to the rate limiter level 38 corresponding to the scheduler 26 in a pattern different from the queue credit level 40 and/or the rate limiter level 38 corresponding to the rate limiters 28. Additionally or alternatively, as described above, an initial credit level for the queue credit level 40 and/or the rate limiter level 38 at the first time may equal a scheduling-cycle-worth-of-credit, however it should be understood that the initial credit level may be any suitable value. For example, an initial credit level may equal zero scheduling-cycle-worth-of-credit, one scheduling-cycle-worth-of-credit, or more.

Figure 9:
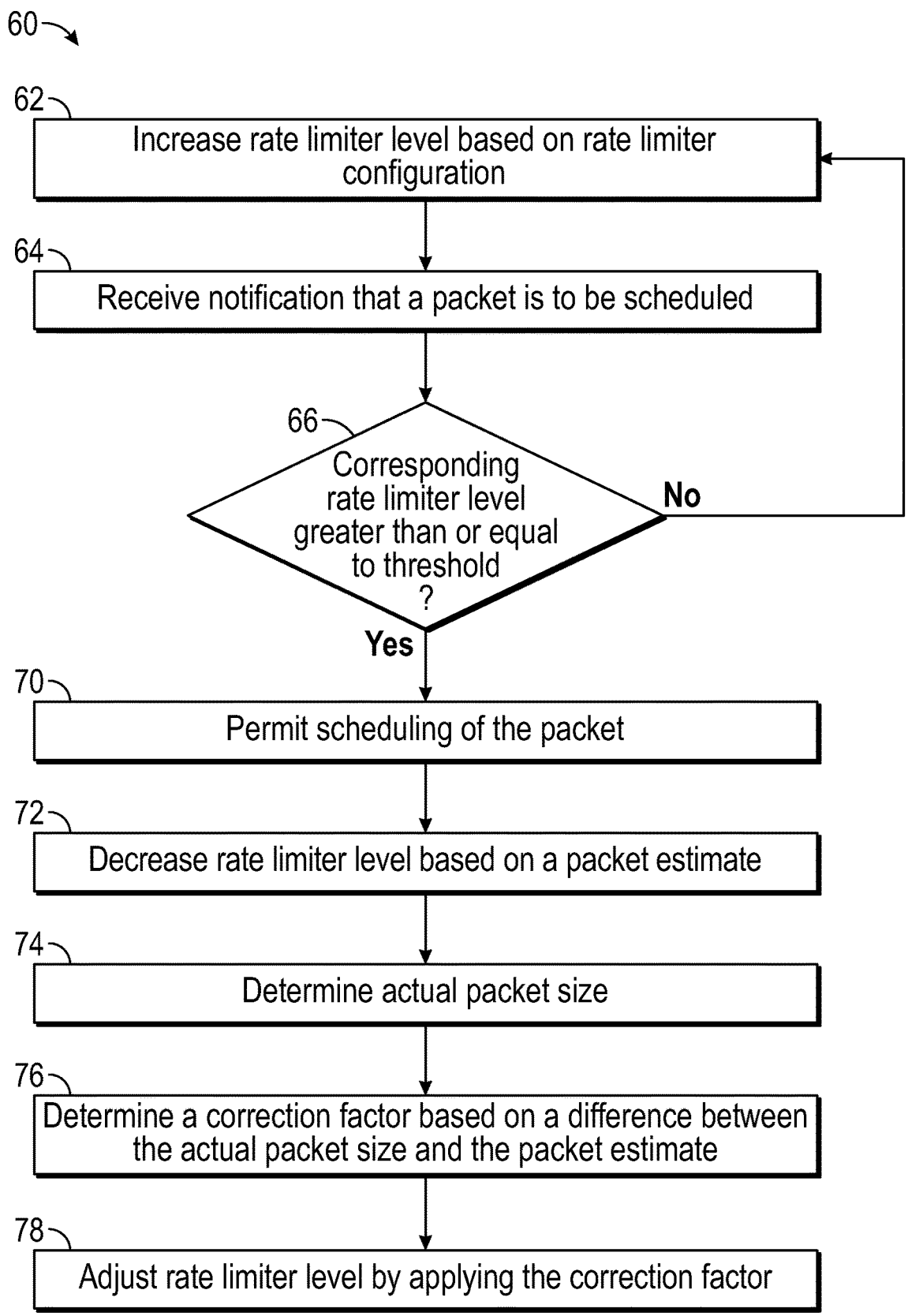
FIG. 9 is a flow chart illustrating a method for adjusting a level of the rate limiter of FIG. 2 using predictive scheduling techniques in accordance with an embodiment of the present disclosure.

To help elaborate, FIG. 9 is a flow chart illustrating a method 60 of adjusting a rate limiter level 38 using predictive scheduling techniques described above, according to embodiments of the present disclosure. In some embodiments, the method 60 may be implemented at least in part by executing instructions stored in a tangible, non-transitory, computer-readable medium, such as the memory 20, using processing circuitry, such as processor 14, the processing circuitry of the host 22, and/or the DMA engine 18. However, as described herein, the method 60 is described as being performed by the QoS engine 19.

During scheduling operations, at block 62, the QoS engine 19 (e.g., QoS engine 19 via a rate limiter 28) may increase a rate limiter level 38 based on the configuration of the rate limiter 28 and/or its corresponding group. For ease of discussion herein, it should be understood that any operation the QoS engine 19 performs to one rate limiter 28, the QoS engine 19 may perform the same operation respectively to each rate limiter 28 of the QoS engine 19. The configuration of the rate limiter 28 may be associated with an amount of credit or bandwidth to be added to the rate limiter level 38 and/or a frequency of the addition to occur at. The amount of credit or bandwidth to be added and/or the frequency of the addition may be based at least in part QoS constraints or guidelines, characteristics of the queue 30 (e.g., a configuration or depth of the queue 30), and so on. Rate limiters 28 may have different configurations and thus may be adjusted by respective values of credit or bandwidth. In this way, a first rate limiter 28 may be increased by a different amount of credit or bandwidth than a second rate limiter 28 based at least in part on the respective rate limiter 28 configurations.

At block 64, the QoS engine 19 may receive a notification that a packet is to be scheduled by the DMA engine 18. When the scheduling operation is initiated by receiving the notification, at block 66, the QoS engine 19 via the rate limiter 28 may determine whether a corresponding rate limiter level 38 has a credit greater than or equal to a threshold amount of credit. The QoS engine 19 may perform this determination so that a packet is not scheduled for a group that has zero, negative, or insufficient credit, or so that a packet is not scheduled for a group that results in a zero, negative, or insufficient credit. An example of sufficient credit may be a level equaling a packet estimate size representative of an amount of resources used to schedule and/or transmit a scheduled packet via the queue 30.

In response to the QoS engine 19 determining that the rate limiter level 38 is less than the threshold, the QoS engine 19 may indicate to the DMA engine 18 to terminate or halt the scheduling operation associated with the packet, and wait at least enough time for a suitable amount of credit to be added to the rate limiter level 38 before resuming the scheduling operation for the packet. Although there may be many suitable ways to do this in an actual implementation of the system 10, in the method 60, this is represented by the QoS engine 19 repeating operations. For example, the QoS engine 19 may continue, at the block 62, to increase the rate limiter level 38 and receiving again, at the block 64, the notification for the packet that was previously delayed a scheduling cycle. At this point, the QoS engine 19 may determine again whether the credit of rate limiter level 38 is greater than or equal to the threshold.

Eventually the QoS engine 19 may determine that the rate limiter level 38 is greater than or equal to the threshold and may proceed, at block 70, to permit, via an indication to the DMA engine 18, scheduling of a packet corresponding to the queue 30 of the rate limiter level 38. Upon determining to schedule a packet, the QoS engine 19 via the rate limiter 28, at block 72, may decrease credit in the rate limiter level 38 based at least in part on a packet estimate size. As described above, the packet estimate size may represent a predetermined value that is used to modify the levels 38, 40 before a determination of actual packet size is made by the QoS engine 19. The packet estimate size represents an estimated bandwidth used to transmit the packet (e.g., scheduled packet). In this way, the QoS engine 19 may track allocation of resources to each group.

At block 74, the QoS engine 19 receives the actual size of the packet (e.g., such as receives the packet size as a feedback signal from the DMA engine 18). As described above, the QoS engine 19 may retrieve the actual size of the packet from any suitable data store that may or may not be separately managed based on data source or customer. For example, the QoS engine 19 may reference descriptors stored in one or more tables, one or more circular rings, or one or more other suitable data stores to determine the actual size of the packet.

After determining and/or receiving the actual size of the packet, the QoS engine 19, at block 76, may determine a correction factor (e.g., such as the correction factor 43). The correction factor may be used to adjust the rate limiter level 38 that was previously decremented at the block 72 using the packet estimate size, as shown in FIGS. 6-8. The value of the correction factor may be based at least in part on a difference between the actual packet size and the packet estimate size used at the block 72. In this way, the value of the correction factor may be a value (e.g., a positive number, a negative number, or a zero value) representative of an adjustment amount for the packet to be applied to the rate limiter level 38.

Using the correction factor, at block 78, the QoS engine 19, via the rate limiter 28, may adjust the rate limiter level 38 by applying the correction factor to the rate limiter level 38. It should be appreciated that the levels 38, 40 are depicted as levels that rise and fall during scheduling operations and may be implemented by tracking a numerical value representative of a level. In this way, the QoS engine 19 may increment, decrement, or adjust the numerical value of the rate limiter level 38 in a way to reflect the determined correction factor. For example, the QoS engine 19 may apply a correction factor equal to 10 bytes to a level by adding 10 bytes (or a value that is proportionally representative of 10 bytes) to the numerical value. Thus, the correction factor applied to the level may be a value (or representative of a value) that shows, relative to the other levels, an amount of bandwidth available to the group of the adjusted level relative to the other levels of the other groups.

It is noted that the QoS engine 19 may repeat the method 60 at the block 62 while at least performing operations of the block 74, the block 76, and/or the block 78. It is also noted that in some cases, the QoS engine 19 may not receive the notification at the block 64. In these cases, the QoS engine 19 may instead repeat operations at the block 62 each scheduling cycle to continue to modify the rate limiter level 38 until a packet is to be scheduled.

Figure 10:
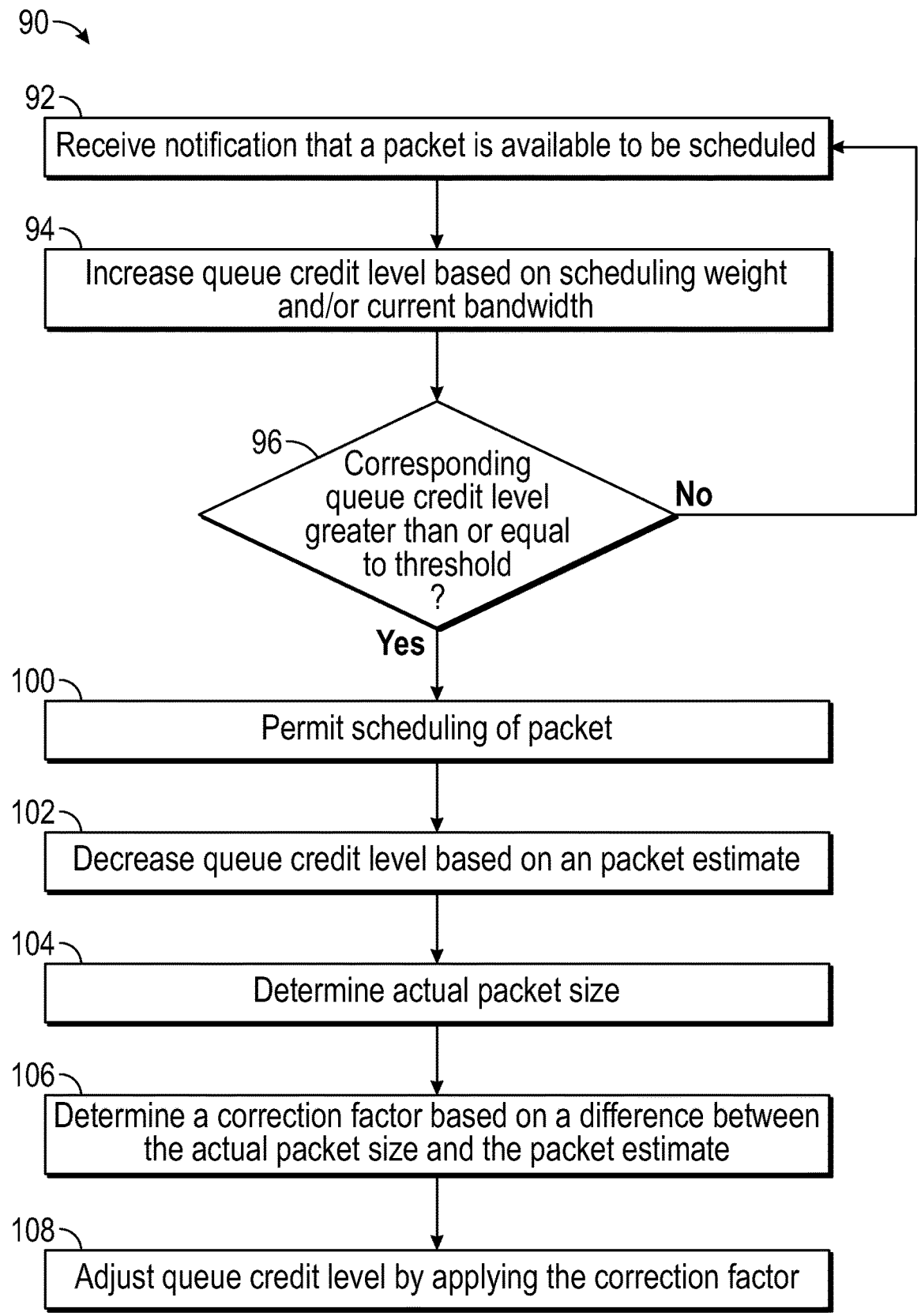
FIG. 10 is a flow chart illustrating a method for adjusting a level of the scheduler of FIG. 2 using predictive scheduling techniques in accordance with an embodiment of the present disclosure.

FIG. 10 is a flow chart illustrating a method 90 of adjusting a queue credit level 40 using predictive scheduling techniques described above, according to embodiments of the present disclosure. In some embodiments, the method 90 may be implemented at least in part by executing instructions stored in a tangible, non-transitory, computer-readable medium, such as the memory 20, using processing circuitry, such as the processor 14, the processing circuitry of the host 22, and/or the DMA engine 18. However, as described herein, the method 90 is described as being performed by the QoS engine 19.

At block 94, the QoS engine 19 may receive a notification that a packet is available to be scheduled. When the scheduling operation is initiated by receiving the notification, at block 94, the QoS engine 19 via the scheduler 26 may increase a queue credit level 40 based on a scheduling weight and/or a current bandwidth. The queue credit level 40 may be adjusted in accordance with predetermined time periods (e.g., at particular intervals), in response to receiving a notification of a packet to be scheduled, or the like. Thus, the queue credit level 40 may be increased based on a current bandwidth accessible via the DMA engine 18 and/or the NIC 16. Furthermore, credit may be apportioned to a respective queue credit level 40 based at least in part on relative scheduling weights associated with the scheduler 26, a current bandwidth of the network coupled to the system 10, or any other suitable factor. The scheduling weight of the queue credit level 40 defines a proportional allocation of bandwidth to queue credit levels 40 for each group. In this way, for example, a first group that is to have four times the bandwidth of a second group may have its queue credit level 40 provided with four times the credit apportioned to the second group at a time of credit allocation. The amount of credit or bandwidth to be added and/or the frequency of the addition may be based at least in part on QoS constraints, characteristics of the queue 30, and so on. The queue credit levels 40 may have different configurations and thus may be adjusted by respective values of credit or bandwidth.

At block 96, the QoS engine 19 may determine whether a corresponding queue credit level 40 has a credit greater than or equal to a threshold amount of credit. The QoS engine 19 may perform this determination so that a packet is not scheduled for a group that has zero, negative, or insufficient credit, or so that a packet is not scheduled for a group that results in a zero, negative, or insufficient credit. An example of sufficient credit may be a level equaling a packet estimate size representative of an amount of resources used to schedule and/or transmit a scheduled packet via the queue 30.

In response to the QoS engine 19 determining that the corresponding queue credit levels 40 is less than the threshold, the QoS engine 19 may instruct the DMA engine 18 to delay the scheduling operation associated with the packet and wait for a suitable amount of credit to be apportioned to the queue credit level 40 before scheduling the packet. Although this may be manifested in many suitable ways in an actual implementation of the QoS engine 19, in the method 90, this is represented by the QoS engine 19 continuing to, at the block 92, increase the queue credit level 40 via the scheduler 26 and receiving again, at the block 94, the notification for the packet to be scheduled that was delayed. At this point, the QoS engine 19 may determine again whether the corresponding queue credit level 40 has a credit at least equal to the packet estimate size.

Eventually, the QoS engine 19 may determine the corresponding queue credit level 40 is greater than or equal to the threshold. In response to the determination, at block 100, the QoS engine 19 may permit the scheduling of the packet (e.g., via indication to the DMA engine 18). After or during the scheduling of the packet, at block 102, the QoS engine 19 may adjust the corresponding queue credit level 40 based at least in part on the packet estimate size. Similar to the block 72, the QoS engine 19 may track allocation of resources to each queue 30 via adjustment to the queue credit levels 40. The QoS engine 19 may decrement the corresponding queue credit level 40 before determining an actual packet size of the packet.

At block 104, the QoS engine 19 may determine and/or receive the actual packet size of the packet. As described above, the QoS engine 19 may retrieve the actual packet size from any suitable data store that may or may not be separately managed based on data source or customer and/or may receive the actual packet size (or a correction factor) from the DMA engine 18 (e.g., as a feedback signal from the DMA engine 18). For example, the QoS engine 19 may reference descriptors stored in one or more tables, one or more circular rings, or one or more other suitable data stores to determine an actual packet size.

After determining the actual packet size, the QoS engine 19, at block 106, may determine a correction factor (e.g., such as the correction factor 43). The correction factor may be used to adjust the corresponding queue credit level 40 to the packet. As described above, the value of the correction factor may be based at least in part on a difference between the actual packet size and the packet estimate size and is applied, at block 108 (similarly to block 78), by the QoS engine 19 to adjust the corresponding queue credit level 40 to the packet, as shown in FIGS. 3-5. In this way, the value of the correction factor applied at the block 108 may be a value (e.g., a positive number, a negative number, or a zero value) representative of an adjustment amount for the packet to be applied to the queue credit level 40. This correction factor may be a same correction factor applied at the block 78 of the method 60. Furthermore, the correction factor of the method 90 and the correction factor of the method 60 may be determined at a substantially same time via a substantially same determination process of the QoS engine 19. In this way, the determination at the block 106 may not be repeated by the QoS engine 19 for the same or similar packet scheduling operation. Furthermore, it is noted that the block 100, the block 104, and the block 106 of the method 90 may be based at least in part on similar and/or shared control operations of the QoS engine 19 as the block 70, the block 75, and the block 76 of the method 60.

It is noted that the QoS engine 19 may repeat the method 90 at the block 92 while performing at least the operations of the block 102, the block 104, the block 106, and/or the block 108. It is also noted that in some cases, the QoS engine 19 may not receive the notification at the block 94. In these cases, the QoS engine 19 may instead repeat operations at the block 92 each scheduling cycle and continue to modify the queue credit level 40 until a packet is to be scheduled. Moreover, the QoS engine 19 may permit or deny scheduling based on both the rate limiter level 38 and the queue credit level 40. In this way, in either method, the QoS engine 19 at block 66 and/or at block 96, may determine whether the corresponding queue credit level 40 and the corresponding rate limiter level 38 are both greater than or equal to the respectively defined thresholds. If yes, the QoS engine 19 permits scheduling of the packet (e.g., at block 70 and/or at block 100), but if no, the QoS engine 19 denies scheduling of the packet (e.g., proceeding to block 62 and/or proceeding to block 92).

In some embodiments, an adjustment to the queue credit level 40 may cause an adjustment to be performed to the rate limiter level 38. For example, the queue credit level 40 may be a negative level corresponding to a positive rate limiter level 38. Thus, the queue credit level 40 may be increased by a scheduling-cycle-worth-of-credit and rate limiter level 38 is still to be decremented by the scheduling-cycle-worth-of-credit (e.g., level deduction equal to the increase of the level) to keep the operations balanced, even in the event that a queue 30 is permitted to over schedule outside of its scheduling weight allocations (as is controlled via operation according to the queue credit levels 40). This deduction to rate limiter level 38 may cause a negative level.

Furthermore, in some embodiments, when the QoS engine 19 is applying a correction factor at the block 108, the corresponding rate limiter level 38 may not be adjusted at all in response to the correction factor (e.g., may not be decremented). The reasoning for this may be that in the past, the rate limiter level 38 was previously decremented based on a packet estimate size that turned out to be an insufficient estimate (e.g., too large). Permitting the rate limiter level 38 to be selectively modified in response to inaccurate packet estimate sizes enables the packet to be scheduled in such a way to compensate for the inaccurate packet estimate sizes.

As described above, in some embodiments, the packet estimate size may change during operation of the system 10. The QoS engine 19 may dynamically change the packet estimate size during scheduling operations based on predicted scheduling operations, average correction factors applied to the levels 38, 40, bandwidth allocations, standard deviations between correction factors applied over time, or the like. In this way, the QoS engine 19 may adjust how much credit is deducted in response to scheduling a packet based on a historical record of actual packet sizes of previously scheduled packets. For example, the QoS engine 19 may decrease the packet estimate size over time as one or more patterns associated with correction factor applied are observed, enabling the QoS engine 19 to use a packet estimate size that reflects the packets scheduled over time. It is noted that adjusting the packet estimate size (or determining an adjustment to make to the packet estimate size) may be performed by any suitable processing circuitry of the system 10.

With the foregoing in mind, the system 10 may be a data processing system or may be a component of a data processing system that may benefit from application of the predictive scheduling techniques described herein. For example, the SoC 12 may be a field programmable gate array and may be a component of a data processing system. The data processing system may include a host processor (e.g., similar to processor 14), memory and/or storage circuitry (e.g., similar to memory 20), and a network interface (e.g., similar to NIC 16 and/or PCIe interface). The data processing system may include more or fewer components (e.g., electronic display, user interface structures, application specific integrated circuits (ASICs)). The host processor may include any suitable processor, such as an Intel® Xeon® processor or a reduced-instruction processor (e.g., a reduced instruction set computer (RISC), an Advanced RISC Machine (ARM) processor) that may manage a data processing request for the data processing system (e.g., to perform machine learning, video processing, voice recognition, image recognition, data compression, database search ranking, bioinformatics, network security pattern identification, spatial navigation, or the like). The memory and/or storage circuitry may include random access memory (RAM), read-only memory (ROM), one or more hard drives, flash memory, or the like. The memory and/or storage circuitry may be considered external memory to the SoC 12 and may hold data to be processed by the data processing system. In some cases, the memory and/or storage circuitry may also store configuration programs (e.g., bitstream) for programming the SoC 12 as a programmable logic device. The network interface may enable the data processing system to communicate with other electronic devices. The data processing system may include several different packages or may be contained within a single package on a single package substrate.

In one example, the data processing system may be part of a data center that processes a variety of different requests. For instance, the data processing system may receive a data processing request via the network and/or the computer bus interface 25 to perform machine learning, video processing, voice recognition, image recognition, data compression, database search ranking, bioinformatics, network security pattern identification, spatial navigation, or some other specialized task. The host processor may cause the programmable logic fabric of the SoC 12 as a programmable logic device to be programmed with a particular accelerator related to requested task. For instance, the host processor may instruct that configuration data (bitstream) stored on the memory/storage circuitry or cached in sector-aligned memory of the SoC 12 as a programmable logic device to be programmed into the programmable logic fabric of the SoC 12 as a programmable logic device. The configuration data (bitstream) may represent a circuit design for a particular accelerator function relevant to the requested task. Due to the high density of the programmable logic fabric, the proximity of the substantial amount of sector-aligned memory to the programmable logic fabric, or other features of the SoC 12 as a programmable logic device that are described here, the SoC 12 may rapidly assist the data processing system in performing the requested task. Indeed, in one example, an accelerator may assist with a voice recognition task less than a few milliseconds (e.g., on the order of microseconds) by rapidly accessing and processing large amounts of data in the accelerator using sector-aligned memory.

The methods and devices of this disclosure may be incorporated into any suitable circuit. For example, the methods and devices may be incorporated into numerous types of devices such as microprocessors or other integrated circuits. Exemplary integrated circuits include programmable array logic (PAL), programmable logic arrays (PLAs), field programmable logic arrays (FPLAs), electrically programmable logic devices (EPLDs), electrically erasable programmable logic devices (EEPLDs), logic cell arrays (LCAs), field programmable gate arrays (FPGAs), application specific standard products (ASSPs), application specific integrated circuits (ASICs), and microprocessors, just to name a few. Furthermore, the methods and devices of this disclosure may be used in tandem with a plethora of scheduling techniques. For example, predictive scheduling techniques may be used when using scheduling disciplines such as first-in, first-out (FIFO), priority-based, round robin, shortest remaining time first, multilevel queue scheduling, or the like.

Moreover, while the method operations have been described in a specific order, it should be understood that other operations may be performed in between described operations, described operations may be adjusted so that they occur at slightly different times or described operations may be distributed in a system which may permit the occurrence of the processing operations at various intervals associated with the processing, as long as the processing of overlying operations is performed as desired.

Thus, the technical effects of the present disclosure include improvements to bandwidth management techniques for computing devices, such as system on chips (SoCs), programmable logic devices (PLDs), field programmable gate arrays (FPGAs), or other suitable computing and/or processing devices. Techniques include scheduling packets via direct memory access (DMA) engine and/or a quality of service (QoS) engine that leverages packet size estimates to perform traffic controlling operations (e.g., scheduling operations). These techniques also include using a correction factor to adjust levels (e.g., credit levels, levels of credit) referenced by the QoS engine during the scheduling operations and/or traffic controlling operations to compensate and/or correct for any discrepancy between the packet size estimate and an actual size of a packet scheduled. The QoS engine may apply the correction factor at a time after or during scheduling of the packet to reduce latencies and/or inefficiencies typically experienced when managing scheduling operations and/or traffic controlling operations based on actual sizes of packets to be scheduled.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

What is claimed is:

1. A method, comprising:
    increasing a level based at least in part on a weight parameter configured to indicate a relative scheduling weight of a queue, wherein the level tracks bandwidth of data read from the queue;
    decreasing the level based at least in part on an estimated packet size in response to scheduling a data packet to be read from the queue;
    receiving an actual packet size of the data packet;
    determining a correction factor based at least in part on a difference between the actual packet size of the data packet and the estimated packet size; and
    adjusting the level by applying the correction factor to the level.

2. The method of claim 1, wherein a host device is configured to generate, via one or more users, the data packet to be read from the queue.

3. The method of claim 1, wherein scheduling the data packet occurs before receiving the actual packet size of the data packet.

4. The method of claim 1, wherein scheduling the data packet is based at least in part on an additional level that corresponds to a rate limiter, and wherein the rate limiter is configured to enforce a maximum bandwidth allocation.

5. The method of claim 4, comprising increasing the additional level based at least in part on a configuration of the rate limiter.

6. The method of claim 1, wherein the level is used to enforce a minimum bandwidth allocation between the queue and an additional queue.

7. The method of claim 6, wherein increasing the level comprises increasing the level by an amount determined based on available bandwidth.

8. A device, comprising:
    a queue configured to queue packets as part of scheduling operations, wherein the queue is associated with a queue credit level that indicates an amount of resources allocated to schedule the packets;

a rate limiter configured to enforce bandwidth requirements of the device, wherein the rate limiter is associated with a rate limiter level indicative of a current bandwidth allocation to the device; and a quality of service (QoS) engine configured to perform the scheduling operations based at least in part on an estimated packet size, the rate limiter level, and the queue credit level, wherein the QoS engine is configured to schedule a data packet via the scheduling operations without knowledge of an actual packet size of the data packet, and wherein the queue credit level is increased based at least in part on a weight parameter configured to indicate a relative scheduling weight of the queue.

9. The device of claim 8, wherein the QoS engine is configured to perform the scheduling operations by:

decreasing the rate limiter level based at least in part on the estimated packet size in response to scheduling the data packet;

determining the actual packet size of the data packet;

determining a correction factor based at least in part on a difference between the actual packet size of the data packet and the estimated packet size; and adjusting the rate limiter level by applying the correction factor to the rate limiter level.

10. The device of claim 8, comprising a scheduler configured to enforce bandwidth allocations of a traffic group, wherein the traffic group is associated with one or more queues.

11. The device of claim 10, wherein the scheduler corresponds to the queue credit level, and wherein the QoS engine is configured to reference both the queue credit level and the rate limiter level when performing the scheduling operations.

12. The device of claim 8, wherein the scheduling operations include managing the rate limiter level based at least in part on a configuration of the rate limiter defining a constant amount of credit to increment the rate limiter level each scheduling cycle.

13. The device of claim 12, comprising a scheduler associated with the queue associated with the rate limiter, wherein the scheduler is configured to decrease the queue credit level of the queue in response to scheduling the data packet, and wherein the rate limiter is configured to decrease the rate limiter level in response to scheduling the data packet.

14. The device of claim 13, wherein the scheduler is configured to adjust the queue credit level based at least in part on the relative scheduling weight, wherein the relative scheduling weight is assigned between the queue and at least one additional queue.

15. A tangible, non-transitory, machine-readable-medium, comprising machine-readable instructions to cause a processor to:

receive a notification that a packet of a queue is to be scheduled;

increase a level based at least in part on a weight parameter configured to indicate a relative scheduling weight of the queue, wherein the level is configured to track an amount of resources allocated for scheduling of the packet;

decrease the level based at least in part on an estimated packet size;

receive an actual packet size of the packet;

determine a correction factor based at least in part on a difference between the actual packet size and the estimated packet size; and adjust the level by applying the correction factor.

16. The tangible, non-transitory, machine-readable medium of claim 15, wherein the actual packet size is received after the packet is scheduled.

17. The tangible, non-transitory, machine-readable medium of claim 15, wherein scheduling the packet occurs based at least in part on an additional level that is associated with a rate limiter, and wherein the rate limiter is configured to limit a bandwidth rate at which a group of queues comprising the queue is permitted to send data.

18. The tangible, non-transitory, machine-readable medium of claim 17, wherein the correction factor is configured to cause the level to be decreased to a negative level.

19. The tangible, non-transitory, machine-readable medium of claim 15, wherein the level is associated with a scheduler, and wherein the scheduler is configured to apportion bandwidth across multiple queues.

20. The tangible, non-transitory, machine-readable medium of claim 19, wherein the correction factor is configured to cause the level to be decreased to a negative level.

* * * * *